May 18, 1937.  W. R. RAY  2,080,633
INTERNAL COMBUSTION ENGINE
Filed Dec. 11, 1935    2 Sheets-Sheet 1

INVENTOR.
William R. Ray
BY
Robert H. Eckhoff
ATTORNEY.

May 18, 1937.                    W. R. RAY                    2,080,633
                       INTERNAL COMBUSTION ENGINE
                          Filed Dec. 11, 1935            2 Sheets-Sheet 2
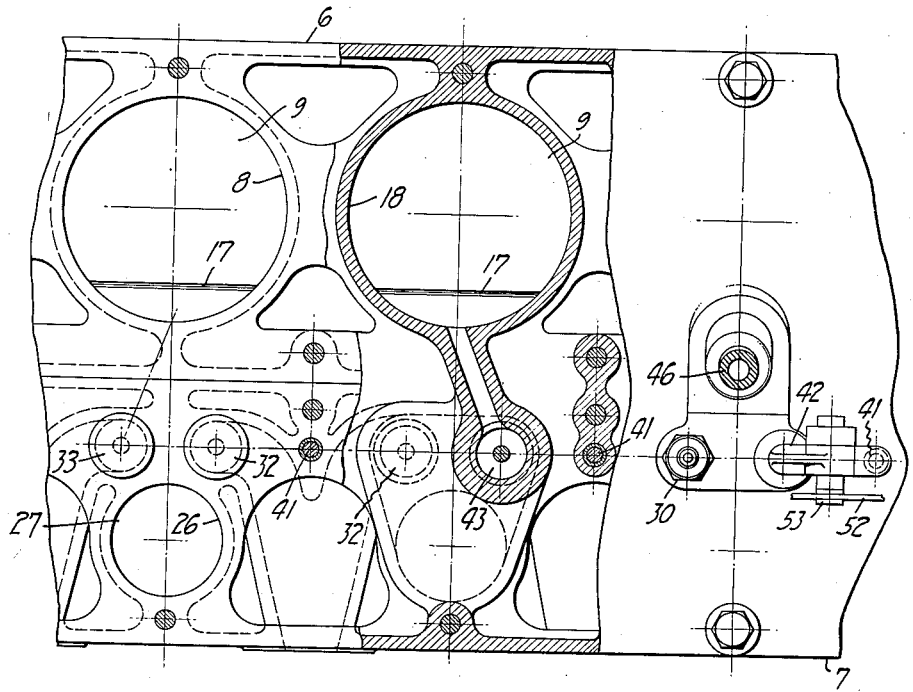
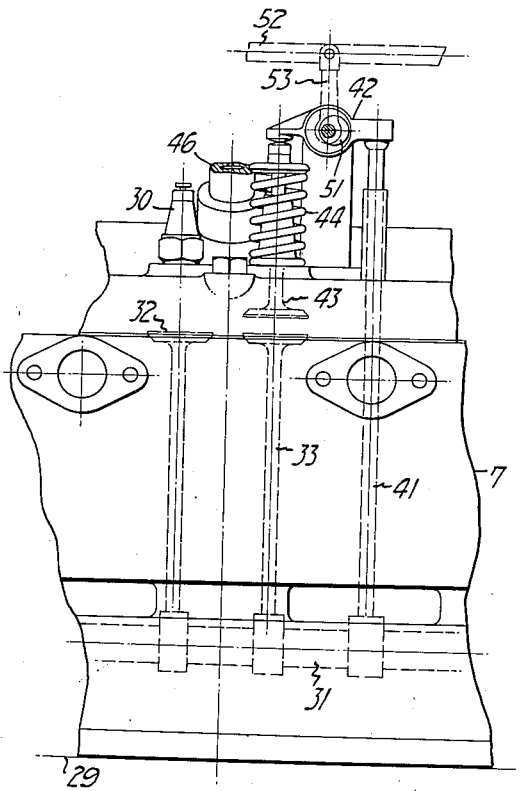
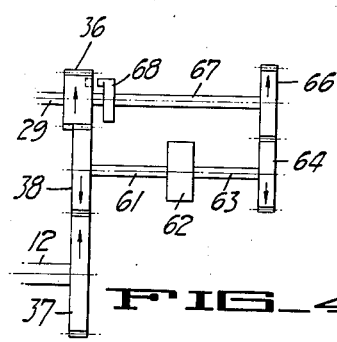
INVENTOR.
William R. Ray
BY Robert H. Eckhoff
ATTORNEY.

Patented May 18, 1937

2,080,633

UNITED STATES PATENT OFFICE 2,080,633

INTERNAL COMBUSTION ENGINE

William R. Ray, San Francisco, Calif.

Application December 11, 1935, Serial No. 53,919

2 Claims. (Cl. 123—179)

This invention relates to improvements in compression ignition engines, the present invention providing an engine capable of operating on Diesel type fuels without certain drawbacks of the Diesel engine. These engines lately have received considerable public attention because of their low operating cost as compared to other prime movers such as the Otto cycle engine. However, the Diesel engine is still subject to the objection that its weight per unit horse power is relatively high as compared to that now attained for the Otto cycle engine. This can be attributed to the fact that in a Diesel engine, operating upon the usual Diesel cycle, ignition of the fuel is secured by compression of the fuel charge. The cylinder walls and pistons must therefore be built very strongly in order to resist the high pressures attained during the compression stroke.

In accordance with this invention I am able to operate an engine upon a Diesel type fuel without depending upon the compression of the fuel charge. Therefore the engine of my invention is much lighter than present Diesel engines since it does not have to withstand the high operating pressures of the usual Diesel.

Present day Diesels are also characterized by the fact that they operate best at full load conditions. When one attempts to operate them at a speed less than that normally attained under full load conditions they are apt to falter and stop. This is because it is so difficult to secure accurate metering of the charge injected into each Diesel cylinder. In accordance with the present invention this difficulty is overcome and I am able to throttle down an oil engine and provide for its idling smoothly and evenly.

It is in general the broad object to improve upon oil engines and operations of oil engines upon Diesel type fuels, particularly by reducing weight of the engine.

The invention includes numerous other objects and features of advantage, some of which, together with the foregoing, will appear hereinafter wherein the present preferred form of engine of my invention is disclosed.

In the drawings accompanying and forming a part hereof, Figure 1 is a vertical cross-sectional view, taken through an engine of my invention.

Figure 2 is a plan view of the engine shown in Figure 1, the cylinder head being broken away to show the arrangement and the relation of the various valve mechanisms.

Figure 3 is a side elevation taken from the right hand side of Figure 1 and showing the arrangement of certain valve mechanisms.

Figure 4 is a diagrammatic view showing the drive connection between the gas and oil engines.

Figure 1:
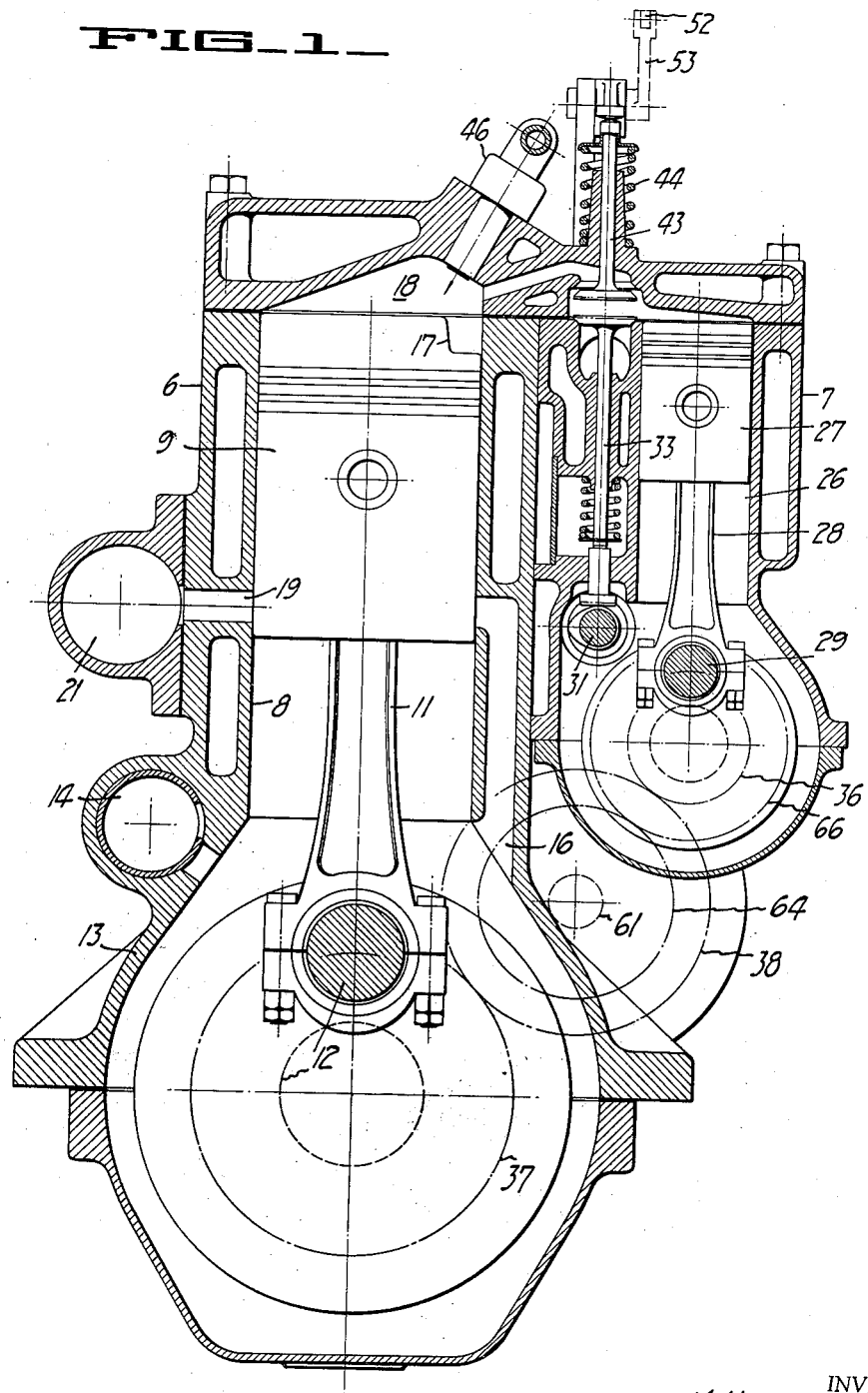

In the form of engine which I have disclosed in the drawings as embodying my invention I have shown an oil engine generally indicated by the numeral 6 and an adjacent gasoline engine 7. The engine 6 includes a plurality of cylinders 8 in each of which a piston 9 moves up and down, power being delivered by connecting rods 11 to crank shaft 12 in crank case 13.

The engine shown is of the two cycle type wherein scavenging air is admitted through a valve controlled inlet 14, through crank case 13 and passage 16. Scavenging air passes into cylinder 8, being deflected by piston head portion 17 and combustion chamber 18 to finally pass out through outlet port 19 and exhaust manifold 21. While an engine of the two cycle type has been shown as typifying the engine herein, it is to be understood that the more complicated four cycle types can be employed if desired. However, I have chosen the two cycle engine as a simple form to which my invention is readily applied.

The gas engine 7 includes a cylinder 26 cooperatively adjacent to each cylinder 8 of the oil engine. In this respect, it is to be pointed out that the combination is not one wherein a gas engine is merely mounted upon the side of a Diesel engine as in the present Caterpillar Tractor Company structures wherein the gas engine is used solely for starting of the Diesel. Instead, each gas engine cylinder is cooperatively adjacent the oil engine cylinders and the operation of each gas engine cylinder is utilized by my invention to supplement operation of the oil engine as will presently appear.

The gas engine shown includes a piston 27 moving in each cylinder 26, each piston being carried by connecting rod 28 on crank shaft 29. The gas engine shown is of the four cycle type. This engine includes a cam shaft 31 operating intake valves 32 and exhaust valves 33. This engine is of the usual gasoline engine including a carburetor and electric ignition system including spark plugs 30.

The two engines are inter-connected, crank shaft 29 supporting a gear 36 and crank shaft 12 carrying a gear 37, the two gears being interconnected by a gear 38 so that they can be operated in a timed relation and so that the functions in the four cycle engine can be accommodated to the two cycle operation of the oil engine. Gear 36 is rotatable on crank shaft 29. Gear 38 is on a stub shaft 61. A clutch 62 can connect this shaft to drive another shaft 63 carrying a gear 64. Gear 66 on crank shaft extension 67 is driven by gear 64. This enables the Otto cycle engine to be started, the clutch 62 being disengaged. When the gas engine is up to speed the clutch 62 can be let in to turn over the oil engine. When the oil engine is rotating, single dog clutch 68 is let in to connect gear 36 with the engine crank shaft while clutch 62 is disengaged. The two engines are thus brought into a timed operating relation.

The cam shaft 31 also includes a cam thereon for lifting cam follower 41 to operate rocker arm 42 and move valve 43 against the bias of spring 44. This valve controls discharge of a compressed and burning fuel charge into combustion chamber 18 of each oil cylinder.

In operation, both engines being at a standstill, it is comparatively easy to start up the small gas engine provided by the several cylinders adjacent to each one of the oil engine cylinders. Thereafter the oil engine is turned over and brought into timed rotation. A part of the charge from the gas engine cylinders is admitted into the cooperating adjacent oil engine cylinders to warm up the oil engine so that it is ready to start immediately upon admission of fuel by the fuel injection means indicated generally at 46. This means comprises a suitable injector supplied with oil at properly timed intervals. It can be either the intermittent type wherein high pressure oil is only supplied at timed intervals or the constant type wherein a valve is operated at timed intervals to release oil from a maintained pressure system.

Control of operation of the valve 43 is by means of a cam 51 which supports each rocker arm 42 so that the operating time and extent of operation of valve 43 can be varied. The cams 51 are connected by rod 52 and levers 53 to permit of a common control. Since the small gas engine utilizes but little fuel it can be used as a constant operating unit in conjunction with the oil engine and permits of readily throttling down of the oil engine inasmuch as the gas engine is of a size sufficient to turn over the oil engine even though that engine is not being supplied with fuel. Thus the oil engine can be readily idled and throttled down and yet be maintained under such conditions that it is always ready to start into operation under load conditions.

The discharging of a charge in each cylinder of the Otto cycle engine into the corresponding cooperating cylinder of the oil engine facilitates combustion, the burning charge from the Otto cycle cylinder mixing with the injected fuel and swirling it with great turbulence about the cylinder in the oil engine while it assists in igniting it at a pressure much lower than in a Diesel. This is because the small engine is operated at a higher compression ratio than the larger engine and because upon ignition of the explosive charge in the smaller engine cylinder, momentarily there exists a very high pressure. This pressure will cause the ignited gases in the Otto cycle cylinder to sweep rapidly through the communicating passage controlled by the valve 43 into the combustion space 18 of each oil engine cylinder. Complete combustion of the fuel charge injected into a Diesel engine cannot be secured without extreme operating pressures, while the engine of my invention can be virtually of gas engine type construction since the operating pressure in my engine is reduced to about that of a gas engine.

I claim:

1. In combination, a compression ignition engine including a cylinder, means for supplying fuel to said cylinder, a piston in said cylinder, a crankshaft, a connecting rod extending between said crankshaft and said piston, an Otto cycle engine including a cylinder and a crankshaft, means for admitting a burning fuel charge to said compression ignition engine cylinder from said Otto cycle engine cylinder, and means for connecting said Otto cycle engine crankshaft to said compression ignition engine, said connecting means including a clutch operable to connect said shafts in a predetermined timed drive relation or to disconnect said shafts whereby said Otto cycle engine can be started and operated independently of said compression engine.

2. In combination, a compression ignition engine including a cylinder, an Otto cycle engine including a cylinder, means for selectively admitting a burning fuel charge from said Otto cycle engine cylinder to said compression ignition engine cylinder, said Otto cycle engine being operable independently of said compression ignition engine, and means for selectively connecting said engines for operation in a timed operation relation and for disconnecting said engines whereby said Otto engine is operable independently of said ignition engine.

WILLIAM R. RAY.